United States Patent [19]
Shaver

[11] Patent Number: 5,544,733
[45] Date of Patent: Aug. 13, 1996

[54] WHEELED LUGGAGE TIPPER

[75] Inventor: Robert Shaver, Brighton, Mich.

[73] Assignee: Jervis B. Webb Company, Farmington Hills, Mich.

[21] Appl. No.: 315,606

[22] Filed: Sep. 30, 1994

[51] Int. Cl.$^6$ .................................................. B65G 47/24
[52] U.S. Cl. ........................................... 198/408; 198/824
[58] Field of Search ................................. 198/399, 400, 198/406, 408, 409, 824, 825, 826, 828, 404; 209/539, 540, 544, 545

[56] References Cited

U.S. PATENT DOCUMENTS

| | | | |
|---|---|---|---|
| 1,905 | 4/1933 | Greenholt | 198/399 |
| 707,355 | 8/1902 | Ridgway. | |
| 794,381 | 7/1905 | Robins, Jr.. | |
| 2,120,385 | 6/1938 | Albertoli | 198/399 |
| 2,417,477 | 3/1947 | Finney, Jr.. | |
| 2,473,004 | 4/1956 | Wright. | |
| 2,998,121 | 8/1961 | Gilbert. | |
| 3,164,238 | 1/1965 | McCullagh. | |
| 3,351,179 | 11/1967 | Thomson. | |
| 3,592,326 | 7/1971 | Zimmerle | 198/395 X |
| 4,326,234 | 12/1982 | McDonald et al. | 198/400 |
| 5,261,521 | 11/1993 | Malow et al. | 198/409 |

*Primary Examiner*—D. Glenn Dayoan
*Attorney, Agent, or Firm*—Gifford, Krass, Groh, Sprinkle, Patmore, Anderson & Citkowski, P.C.

[57] ABSTRACT

The invention relates to a conveyor that ensures the orientation of an item in a prone position when the item is fed onto a main conveyor. By ensuring the orientation of an item in a prone position, the invention can be used to transport luggage or equipment, such as wheeled luggage or golf bags, to an end distribution area. The conveyor provides for an in-feed section, an intermediate section and a discharge section of a conveyor. The in-feed and discharge sections both run parallel to the main support frame of the conveyor and provide a flat area to receive and discharge the material to be transported. The intermediate section extends between the receiving and delivery section and discharge section of the conveyor and has a V-shaped contour so as to tip the item being transported into a prone position.

7 Claims, 2 Drawing Sheets

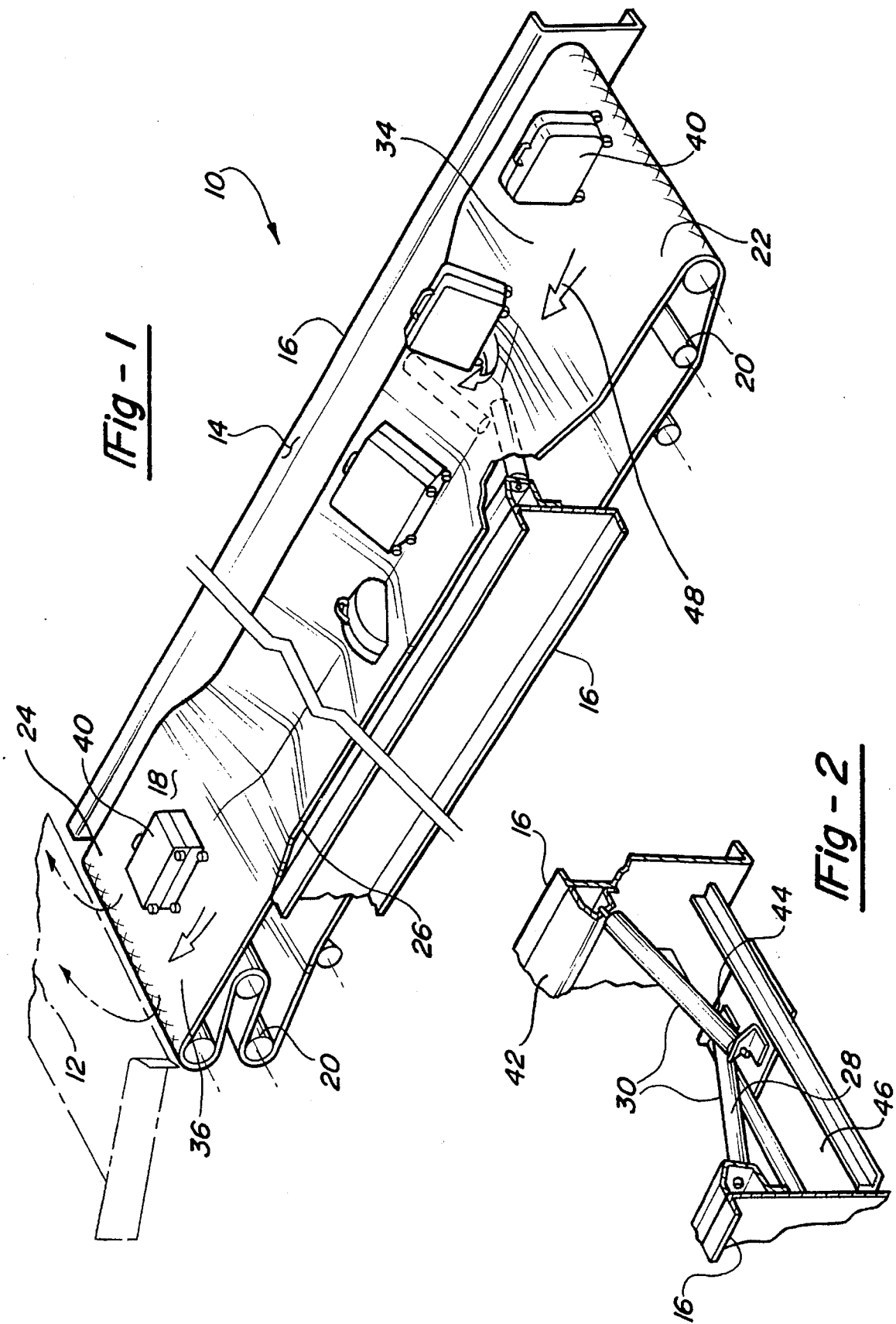

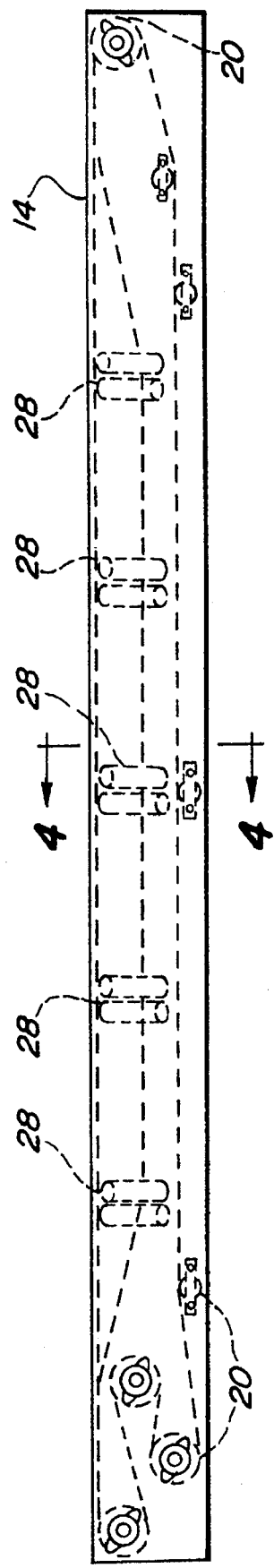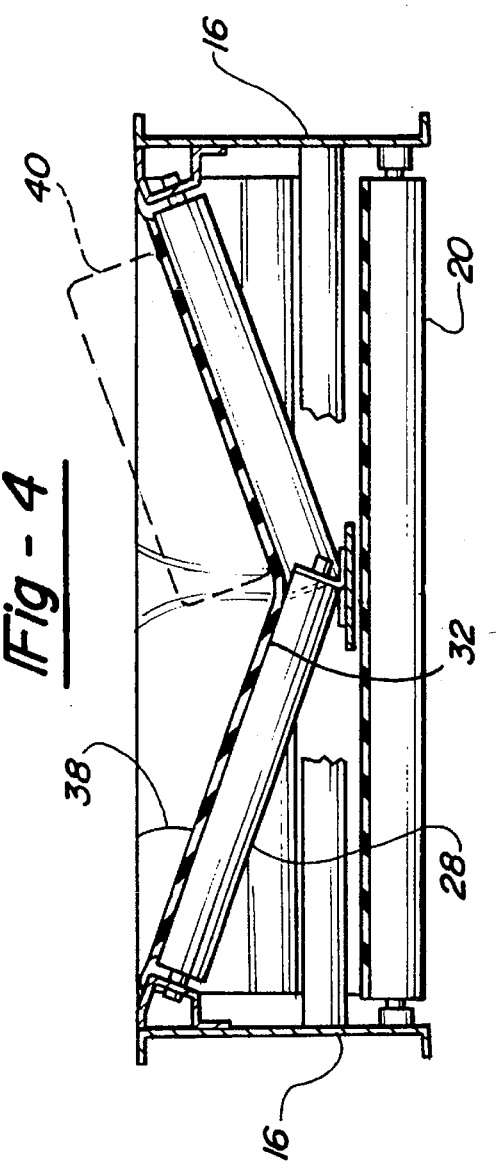

WHEELED LUGGAGE TIPPER

BACKGROUND OF THE INVENTION

I. Field of the Invention

The present invention relates generally to a conveyor. More particularly, the present invention relates to a conveyor for tipping items, such as wheeled luggage, to a prone position onto a conveyor.

II. Description of the Relevant Art

Conveyors having a continuous belt for transporting items from a receiving point to a dispensing point are well known. Previous continuous belt conveyors disclose a continuous belt conveyor for transporting cement and other fine-grained particles. Edges of the belt are joined together to form a tubular conveyor to support the cement during transport to a discharge station.

A troughing type conveyor may be used to transport granular material, such as coal. For instance, a belt conveyor having a U-shaped trough may be equipped with vibrating troughing idler rollers to impart a steady vibration to the conveyor belt causing the coal to migrate toward the center of the belt during conveyance. These types of conveyors are not well suited for many types of items, such as boxes and luggage.

Also known are belt conveyor systems for use in airport terminals to deliver luggage to and from passengers. In such systems, the luggage is frequently carried sequentially by a number of belts. The luggage is placed on the conveyor system in an upright position by a baggage handler. However, luggage, particularly wheeled luggage, has a tendency to move out of alignment as it is being transferred from belt to belt or fall off the belt while it is being transported through the belt conveyor system. Thus, it would be advantageous to have a conveyor system which would prevent the misalignment or movement of the luggage off the belt.

SUMMARY OF THE PRESENT INVENTION

The invention relates to a conveyor system that orientates an item such as a piece of luggage in a face-down or prone position before the item is fed onto a main conveyor system. The conveyor acts to tip items which are in a relatively unstable position because of a high center of gravity to a more stable position with a lower center of gravity. Such a conveyor is particularly useful in transporting luggage through airports.

The invention comprises a belt conveyor. The conveyor includes a frame having a frame supporting belt for transporting items such as luggage. The V-shaped intermediate section extends between a generally planar receiving and a generally planar discharge section of the conveyor. In the intermediate section, the items on the conveyor are carried at an angle because of the V-shaped trough. Items of luggage which are taller than wide are in an unstable position when supported from below at an angle. Accordingly, such items tip over to the prone or face-down position when travelling through the intermediate section. Pairs of idler rollers are mounted to the frame and angled with respect to each other so as to form the V-shaped trough.

The item is then fed to a discharge section in a prone position and transferred onto the main conveyor system in this same position. By tipping the items into a prone position, the user is ensured that the material is discharged onto the main conveyor system in a stable prone position which eliminates misalignment or careening off the side of the conveyor of the items.

Other advantages and features of the present invention will become more apparent from the following detailed description when read in conjunction with the accompany drawings.

BRIEF DESCRIPTION OF THE DRAWING

The present invention will be more fully understood by reference to the following detailed description of the preferred embodiments of the present invention when read in conjunction with the accompanying drawing, in which like reference characters refer to like parts throughout the view, and in which:

FIG. 1 is plan view of the conveyor system of the present invention;

FIG. 2 is a fragmentary plan view showing the area of the conveyor system of the present invention that forces the orientation of material in a prone position onto a main conveyor system;

FIG. 3 is a side of a preferred embodiment of the present invention; and

FIG. 4 is a sectional view of the embodiment of FIG. 3.

DETAILED DESCRIPTION OF A PREFERRED EMBODIMENT OF THE PRESENT INVENTION

With reference to FIG. 1, a conveyor 10 particularly suited for tipping an item 40, such as a piece of luggage, is thereshown. The conveyor system 10 includes a main frame 14 having a pair of longitudinally extending parallel spaced rails 16. The conveyor system 10 further includes a continuous belt 18 extending between the parallel spaced rail 16. A power driving assembly is provided within the main frame 14 for moving the belt 18 horizontally about the main frame 14. Although the system shown is particularly suited for luggage, the system may be used for any item which has a relatively high center of gravity in one alignment and a lower, more stable, center of gravity in a second alignment.

The power driving assembly (not shown) includes a motor (not shown) for driving a drive wheel 20. The drive wheel 20 frictionally engages belt 18 to move the belt about the main frame 14. The belt 18 is supported along a path of conveyance 48 by idler rollers 28 and drums. The drums rotate freely to guide belt 18 as it is being driven by drive wheel 20. A take-up assembly is provided opposite the drive wheel 20 along the conveyor path 48. The take-up assembly includes three drums each freely rotatable. The take-up assembly provides tension to belt 18. If the belt 18 becomes stretched through use and does not frictionally engage drive wheel 20a, take-up assembly drum is moved inwardly toward drive wheel 20 to tighten the slack in belt 18. The take-up assembly drum 52 may also be moved outward away from drive wheel 20 to increase the slack in belt 18, thereby increasing the frictional engagement of belt 18 along the idler rolls 28. Increasing the slack of belt 18 may be necessary to create the V-shaped profile desired to allow material 40 to fall into a prone position.

As shown in FIG. 1, the conveyor includes an in-feed conveyor section 22 extending from one end of the frame 14 for receiving an item 40. Preferably, the in-feed conveyor section 22 extends along a horizontal plane 34 parallel to spaced rail 16.

The conveyor also includes a discharge conveyor section 24 extending from an opposite end of the main frame 14 for delivering luggage 40 onto a main conveyor system 12 after the luggage has been tipped to a more stable configuration. The discharge conveyor section 24 also extends along a horizontal plane 36 parallel to the spaced rails 16.

An intermediate conveyor section 26 extends between the in-feed conveyor section 22 and the discharge conveyor section 24. As best shown in FIGS. 2 and 4, the intermediate conveyor section 26 operates to ensure the item 40 is transferred from the belt conveyor system 10 to the main conveyor system 12 in a prone position by providing a V-shaped section of the belt 18. The V-shaped section has two longitudinal portions which are angled at approximately 140° to each other. The longitudinal portions are supported on a series of troughing roller idler assemblies 28 as shown in FIG. 3.

With reference to FIGS. 2 and 4, each idler assembly includes a pair of idler rollers 30. One end of the roll is rotatably mounted in bracket 42 mounted to a side portion of the main frame 14 and an other end is mounted in a lower bracket 44 which is supported on a crosspiece 46 extending perpendicularly between the spaced rails 16. The rollers are mounted on an inclined axis 38 of approximately 20 degrees from the horizontal plane. For items such as luggage the 20 degree angle from horizontal ensures that the troughing roller idler assembly 28 will support the continuous belt 18 in a V-shaped contour 32.

With reference to FIG. 1, the preferred embodiment of the conveyor 10 of the present invention is shown in use. The item 40, such as wheeled luggage, is set upon the conveyor 10 at the in-feed section 22. The wheeled luggage 40 has been set upon the conveyor 10 in an upright position or relatively unstable position.

As the item approaches the intermediate section 26 of the conveyor 10, the continuous belt 18 forms a V-shaped contour 32 defined by the troughing roller idler assemblies 28 due to gravity and the weight of the wheeled luggage 40. Luggage which is unstable because of a high center of gravity will fall to either side of the V of the belt and thus travel in a prone position to the discharge section 24.

As the luggage 40 approaches the discharge section 24 of the conveyor, the luggage 40 has a tendency to stay in the prone position as it enters the horizontal plane 36 defined by the discharge section 24. As such, luggage 40 is fed onto a main conveyor system 12 in a prone position.

Having described my invention, however, many modifications, such as use of driven rollers rather than a belt to move the luggage through a V-shaped section, will become apparent to those skilled in the art. These and other changes are within the spirit of the invention as defined by the scope of the appended claims.

I claim:

1. A conveyor for transporting an item comprising;

a belt;

a frame having an intermediate section, said intermediate section having a support structure for said belt, said support structure forming a V-shaped trough in said belt such that said item being transported on said belt is tipped to a prone position; and means for driving said belt about said frame.

2. The conveyor as defined in claim 1, wherein said support structure comprises at least one pair of idler rollers mounted to said frame, each of at least one pair of idler rollers angled with respect to each other to support said belt in said V-shaped trough.

3. The conveyor as set forth in claim 1, further comprising an in-feed section disposed upstream from said intermediate section, said belt being generally planar in said in-feed section.

4. The conveyor as set forth in claim 1, further comprising a discharge section disposed downstream from said intermediate section, said belt being generally planar in said discharge section.

5. The conveyor as set forth in claim 2, wherein said frame has a longitudinal axis and each of said at least one pair of rollers to said longitudinal axis is mounted at an angle of 20 degrees to a horizontal plane extending through said axis.

6. The conveyor as set forth in claim 1, wherein said frame further comprises a pair of spaced apart parallel rails.

7. The conveyor as set forth in claim 2, wherein said at least one pair of rollers comprises a plurality of pairs of rollers.

* * * * *

UNITED STATES PATENT AND TRADEMARK OFFICE
CERTIFICATE OF CORRECTION

PATENT NO. : 5,544,733
DATED : August 13, 1996
INVENTOR(S) : Robert Shaver

It is certified that error appears in the above-indentified patent and that said Letters Patent is hereby corrected as shown below:

Column 2, line 55, delete "20a," and insert --20, a--;

Column 2, line 57, after "drum", delete "52".

Signed and Sealed this

Twenty-fourth Day of December, 1996

Attest:

BRUCE LEHMAN

*Attesting Officer*          *Commissioner of Patents and Trademarks*